(12) United States Patent
Hong et al.

(10) Patent No.: US 10,311,275 B2
(45) Date of Patent: Jun. 4, 2019

(54) FINGERPRINT SENSOR AND METHOD OF DRIVING THE SAME

(71) Applicant: SAMSUNG ELECTRONICS CO., LTD., Suwon-si (KR)

(72) Inventors: Seogwoo Hong, Yongin-si (KR); Dongkyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 15/424,130

(22) Filed: Feb. 3, 2017

(65) Prior Publication Data

US 2018/0060636 A1   Mar. 1, 2018

(30) Foreign Application Priority Data

Aug. 24, 2016   (KR) .................. 10-2016-0107776

(51) Int. Cl.
  *G06K 9/28*  (2006.01)
  *G06K 9/00*  (2006.01)
(52) U.S. Cl.
  CPC ....... *G06K 9/0002* (2013.01); *G06K 9/00087* (2013.01)
(58) Field of Classification Search
  CPC .................................................. G06K 9/0002
  See application file for complete search history.

(56) References Cited

U.S. PATENT DOCUMENTS

| | | | |
|---|---|---|---|
| 6,900,644 B2 | 5/2005 | Chou et al. | |
| 7,030,860 B1 | 4/2006 | Hsu et al. | |
| 8,107,212 B2 | 1/2012 | Nelson et al. | |
| 8,564,314 B2 | 10/2013 | Shaikh et al. | |
| 8,599,150 B2 | 12/2013 | Philipp | |
| 8,867,799 B2 | 10/2014 | Benkley, III | |
| 9,141,239 B2 | 9/2015 | Yun et al. | |
| 9,285,910 B2 | 3/2016 | Kim et al. | |
| 2012/0050216 A1* | 3/2012 | Kremin ................. | G06F 3/0416 345/174 |
| 2012/0105325 A1 | 5/2012 | Brosnan et al. | |
| 2013/0127744 A1 | 5/2013 | Shakya et al. | |
| 2013/0314366 A1* | 11/2013 | Mo ........................ | G06F 3/044 345/174 |
| 2014/0152609 A1 | 6/2014 | Kim et al. | |
| 2016/0005352 A1 | 1/2016 | Kim et al. | |
| 2016/0148034 A1 | 5/2016 | Kremin et al. | |
| 2016/0154497 A1 | 6/2016 | Lee et al. | |
| 2017/0286739 A1* | 10/2017 | Shibano ............. | G06K 9/00087 |

FOREIGN PATENT DOCUMENTS

| | | |
|---|---|---|
| EP | 1 536 368 A1 | 6/2005 |
| JP | 2015-506011 A | 2/2015 |
| KR | 10-1474733 B1 | 12/2014 |
| KR | 10-1585201 B1 | 1/2016 |
| KR | 10-1606874 B1 | 3/2016 |
| WO | 2016/127117 A1 | 8/2016 |

OTHER PUBLICATIONS

Communication issued by the European Patent Office dated Dec. 8, 2017 in counterpart European Patent Application No. 17169302.1.

* cited by examiner

*Primary Examiner* — Brian Werner
(74) *Attorney, Agent, or Firm* — Sughrue Mion, PLLC

(57) ABSTRACT

Sensing sensitivity of a fingerprint sensor may be enhanced by grouping driving electrodes and driving groups. A processor of the fingerprint sensor may calculate mutual capacitance at each node on a touchpad from gross mutual capacitances in areas including a plurality of channels.

13 Claims, 16 Drawing Sheets

FIG. 14

| 1 | 2 | 3 | 2 | 1 |
|---|---|---|---|---|
| 2 | 4 | 6 | 4 | 2 |
| 3 | 6 | 9 | 6 | 3 |
| 2 | 2 | 3 | 2 | 1 |
| 1 | 2 | 3 | 2 | 1 |

FIG. 15
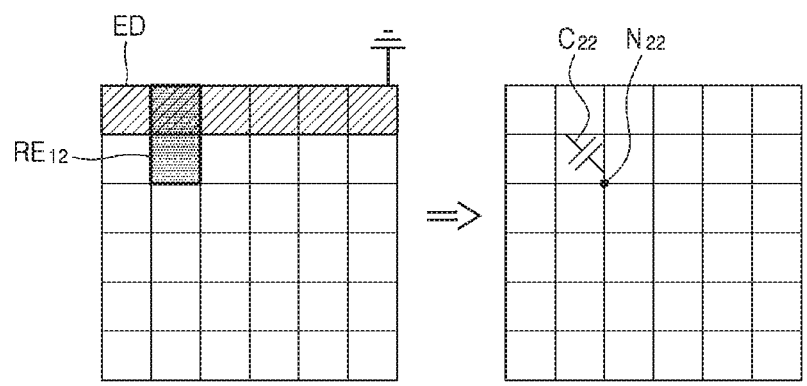
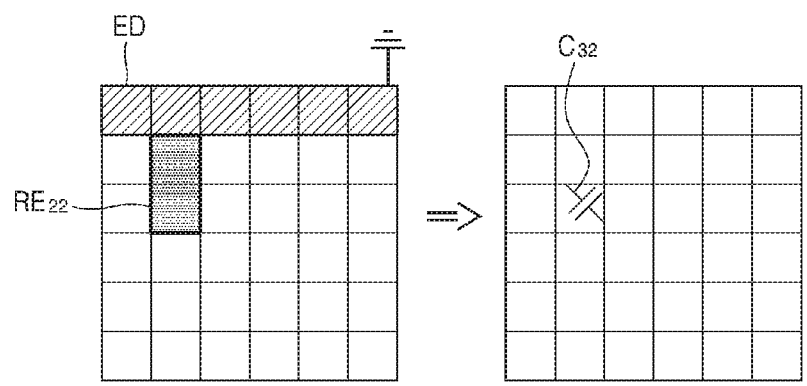

FINGERPRINT SENSOR AND METHOD OF DRIVING THE SAME

CROSS-REFERENCE TO RELATED APPLICATION

This application claims priority from Korean Patent Application No. 10-2016-0107776, filed on Aug. 24, 2016, in the Korean Intellectual Property Office, the disclosure of which is incorporated herein by reference in its entirety.

BACKGROUND

1. Field

Apparatuses and methods consistent with exemplary embodiments relate to sensing a fingerprint of a user.

2. Description of the Related Art

Needs for authentication of an individual by using individual's unique characteristics, such as a fingerprint, a voice, a face, a hand, and an iris, have gradually increased. Functions of authentication of an individual are mainly used in a banking device, an access controller, a mobile device, a notebook computer, etc. Recently, as mobile devices such as a smart phone have been widely used, fingerprint identification devices for authentication of an individual have been employed for protecting a large amount of security information stored in the smart phone.

A need level of accuracy in fingerprint sensing has increased and a fingerprint sensing device having high resolution and high sensitivity is needed.

SUMMARY

One or more exemplary embodiments provide a fingerprint sensor having high resolution and high sensitivity, and a method of driving the same.

According to an aspect of an exemplary embodiment, there is provided a fingerprint sensor including: a touchpad including a plurality of driving electrodes and a plurality of sensing electrodes, the plurality of sensing electrodes being disposed in a direction intersecting with the plurality of driving electrodes, the plurality of driving electrodes being divided into a plurality of driving groups; a driver configured to sequentially apply a driving signal to each of the plurality of driving groups; and a signal measurement unit configured to measure electrical signals generated from the plurality of sensing electrodes in response to the driving signal.

Order numbers of the driving electrodes included in each of the plurality of driving groups may be sequentially changed in accordance with an order number of each of the plurality of driving groups.

An $n^{th}$ driving group among the plurality of driving groups may include $n^{th}$ to $(n+k)^{th}$. n is an arbitrary natural number and k is another arbitrary natural number.

The signal measurement unit may be configured to sequentially measure the electrical signals output from each of the plurality of sensing electrodes.

The signal measurement unit may be configured to group the plurality of sensing electrodes into a plurality of sensing groups and sequentially measure the electrical signals output from each of the plurality of sensing groups, and each of the plurality of sensing groups may include at least two sensing electrodes.

The order numbers of the sensing electrodes included in each of the plurality of sensing groups may be sequentially changed in accordance with the order number of each of the plurality of sensing groups.

An $n^{th}$ sensing group among the plurality of sensing groups may include $n^{th}$ to $(n+k)^{th}$ sensing electrodes. n is an arbitrary natural number and k is another arbitrary natural number.

The fingerprint sensor may further include a processor configured to calculate mutual capacitance based on the electrical signal measured by the signal measurement unit, at each of a plurality of nodes at which each of the plurality of driving electrodes intersects with each of the plurality of sensing electrodes.

In calculating the mutual capacitance at a certain node, the processor may be configured to assign different weights to gross mutual capacitances measured in each of the plurality of driving groups, based on a location of the certain node.

The signal measurement unit may be configured to group the plurality of sensing electrodes into the plurality of sensing groups and sequentially measure the electrical signals output from each of the plurality of sensing groups, and the processor may be configured to assign different weights to the gross mutual capacitances measured in each of the plurality of sensing groups, based on the location of the certain node.

The fingerprint sensor may further include an electrode configured to apply a predetermined fixed voltage to at least two channels among a plurality of channels formed by the plurality of driving electrodes and the plurality of sensing electrodes on the touchpad.

Channels receiving the predetermined fixed voltage may be placed on a periphery of the touchpad.

The processor may be configured to calculate a mutual capacitance at a channel adjacent to the channels receiving the fixed voltage, based on a gross mutual capacitance in an area which includes the channels receiving the fixed voltage and the channel adjacent to the channels receiving the fixed voltage.

According to an aspect of another embodiment, there is provided a method of driving a fingerprint sensor including a plurality of driving electrodes and a plurality of sensing electrodes disposed in a direction intersecting with the plurality of the driving electrodes, the plurality of driving electrodes being divided into a plurality of driving groups. The method of driving the fingerprint sensor may include: sequentially applying a driving signal to each of the plurality of driving groups; and measuring electrical signals generated from the plurality of sensing electrodes in response to the driving signal.

The method may further include sequentially changing order numbers of the driving electrodes included in each of the plurality of driving groups as an order number of each of the plurality of driving groups increases.

The measuring the electrical signal may further include grouping the plurality of sensing electrodes into a plurality of sensing groups and sequentially measuring the electrical signal output from each of the plurality of sensing groups.

The method may further include sequentially changing order numbers of sensing electrodes included in each of the plurality of sensing groups in accordance with an order number of each of the plurality of sensing groups.

The method of driving the fingerprint sensor may further include calculating mutual capacitance based on the measured electrical signal, at each of a plurality of nodes at which each of the plurality of driving electrodes intersects with each of the plurality of sensing electrodes.

The calculating the mutual capacitance may include assigning different weights to gross mutual capacitances measured in each of the plurality of driving groups, based on a location of the certain node.

The measuring the electrical signal may include grouping the plurality of sensing electrodes into the plurality of sensing groups and sequentially measuring the electrical signal output from each of the plurality of sensing groups, and the calculating the mutual capacitance may include assigning different weights to the electrical signals output from each of the plurality of sensing groups.

The method may further include applying a predetermined fixed voltage to at least two channels among a plurality of channels formed by the plurality of driving electrodes and the plurality of sensing electrodes.

The calculating the mutual capacitance may comprise calculating the mutual capacitance at a channel adjacent to the channel receiving the fixed voltage, based on a gross mutual capacitance in an area which includes the channel receiving the predetermined fixed voltage and the channel adjacent to the channel receiving the fixed voltage.

According to an aspect of another exemplary embodiment, there is provided a fingerprint sensor including: a plurality of driving electrodes; a plurality of sensing electrodes that are disposed to intersect with the plurality of driving electrodes; a driver configured to simultaneously apply a drive signal to at least two immediately adjacent driving electrodes of the plurality of driving electrodes; and a signal detector configured to detect an electric signal generated from at least one sensing electrode that intersects with the at least two immediately adjacent driving electrodes, among the plurality of sensing electrodes, in response to the driving signal being applied to the at least two immediately adjacent driving electrodes.

BRIEF DESCRIPTION OF THE DRAWINGS

The above and/or other aspects will be more apparent by describing certain exemplary embodiments, with reference to the accompanying drawings, in which:

FIG. 14 illustrates the number of overlapping times of channels after respective channels has been repeated in areas in FIG. 13;

FIG. 15 illustrates an example wherein an electrode of the fingerprint sensor applies a predetermined fixed voltage to a portion of channels included on the touchpad.

DETAILED DESCRIPTION

Figure 1:
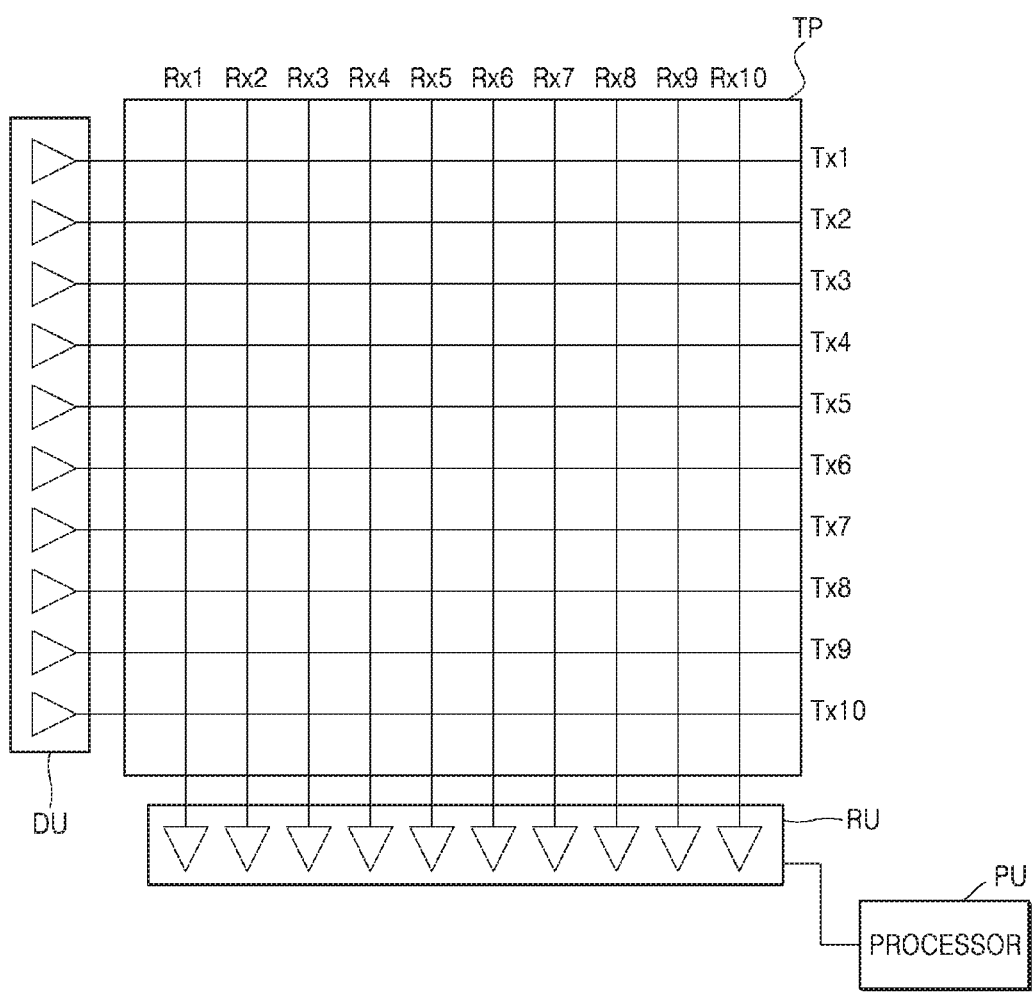
FIG. 1 illustrates a configuration of a fingerprint sensor according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Throughout the specification, when a portion is connected to another portion, the case may include not only being directly connected but also being electrically connected with other elements therebetween. When a portion includes a composing element, the case may denote further including other composing elements without excluding other composing elements unless otherwise described. The terms " . . . unit" or "module" may denote a unit performing one of specific function or movement and may be realized by hardware, software or a combination of hardware and software.

Throughout the specification, the term "consists of" or "includes" should not be interpreted as meaning that all of various elements or steps described in the specification are absolutely included, and should be interpreted as meaning that some of elements or steps may not be included or that additional elements or steps may be further included.

In addition, while such terms as "first," "second," etc., may be used to describe various components, such components must not be limited to the above terms. The above terms are used only to distinguish one component from another.

FIG. 1 illustrates a configuration of a fingerprint sensor according to an exemplary embodiment.

Referring to FIG. 1, the fingerprint sensor according to an exemplary embodiment may include a touchpad TP including a plurality of driving electrodes Tx and a plurality of sensing electrodes Rx disposed in a direction intersecting with the plurality of driving electrodes Tx. In addition, the fingerprint sensor may include a driver DU applying driving signals to the plurality of driving electrodes Tx and a signal measurement unit RU measuring electrical signals from the plurality of sensing electrodes Rx. The signal measuring unit RU may be also referred to as a signal detector.

The touchpad TP may include the plurality of driving electrodes Tx and the plurality of sensing electrodes Rx. The driving electrodes Tx and the sensing electrodes Rx may be disposed in a first direction and a second direction, respectively, so that the driving and sensing electrodes Tx and Rx mutually intersect with each other. In FIG. 1, a case in which the driving electrodes Tx and the sensing electrodes Rx perpendicularly intersect with each other is illustrated. However, the exemplary embodiment is not limited thereto. For example, an angle between directions along which the driving electrodes Tx and the sensing electrodes Rx are respectively formed may not be 90°.

When a user's finger approaches the touchpad TP, mutual capacitance between each of the driving electrodes Tx and each of the sensing electrodes Rx of the touchpad may vary. For example, depending on a pattern shape of the user's fingerprint, the mutual capacitance may vary at each of the nodes wherein the driving electrodes Tx and the sensing electrode Rx intersect with each other on the touchpad. As distances between the driving electrodes Tx and the distances between the sensing electrodes Rx decrease, the resolution of the fingerprint sensor may increase. On the touchpad, a protection film that protects the driving electrodes Tx and the sensing electrodes Rx may be further provided.

The plurality of driving electrode Tx and the plurality of sensing electrode Rx may include wire electrodes. As another example, each of the plurality of driving electrodes Tx may further include certain patterns between nodes at which the driving electrodes Tx and the sensing electrodes Rx intersect with each other. The pattern may have various shapes such as a polygon and a circle. However, the exemplary embodiment is not limited thereto. Similarly, each of the plurality of sensing electrodes Rx may further include the certain patterns between the nodes.

The driver DU may apply driving signals to the driving electrodes Tx. For example, the driver DU may apply voltage pulses to the driving electrodes Tx. The signal measurement unit RU may measure the electrical signals from the sensing electrodes Rx. For example, the signal measurement unit RU may measure current flowing through the sensing electrodes Rx. As another example, the signal measurement unit RU may measure voltages of the sensing electrodes Rx.

Figure 2:
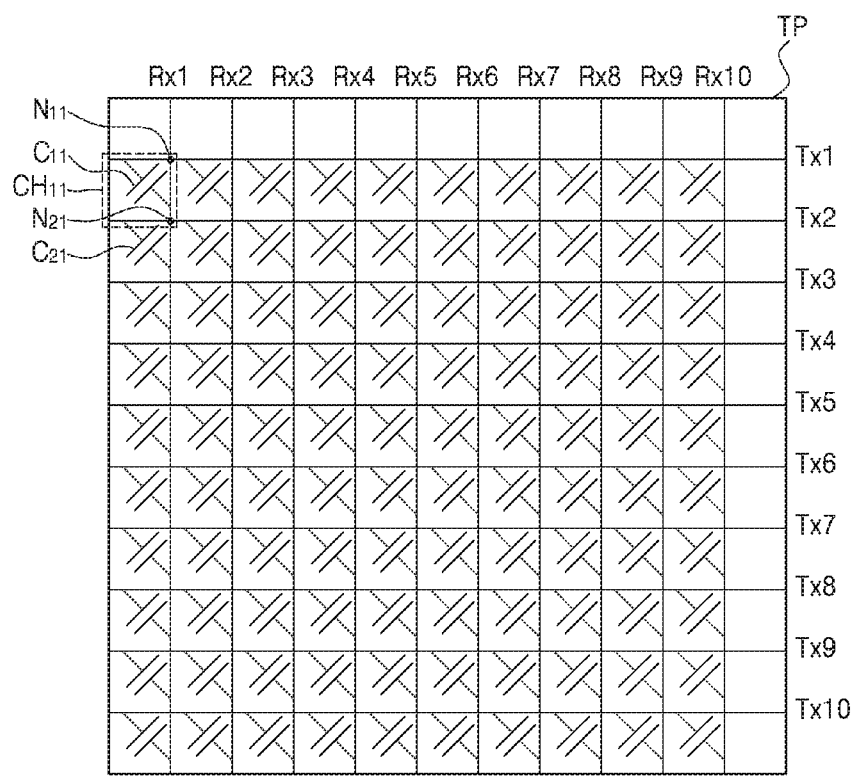
FIG. 2 is a conceptual drawing illustrating mutual capacitance corresponding to respective nodes of a touchpad.

FIG. 2 is a conceptual drawing illustrating the mutual capacitance corresponding to respective nodes of a touchpad.

Referring to FIG. 2, the mutual capacitance between each of the driving electrodes Tx and each of the sensing electrodes Rx may correspond to respective nodes at which the driving electrodes Tx and the sensing electrodes Rx intersect with each other.

For example, a mutual capacitance $C_{11}$ between a first driving electrode Tx1 and a first sensing electrode Rx1 may correspond to a node $N_{11}$ at which the first driving electrode Tx1 and the first sensing electrode Rx1 intersect with each other. Similarly, a mutual capacitance $C_{mn}$ between an $m^{th}$ driving electrode Txm and an $n^{th}$ sensing electrode Rxn may correspond to a node $N_{mn}$ at which the $m^{th}$ driving electrode Txm and the $n^{th}$ sensing electrode Rxn intersect with each other. m and n are arbitrary natural numbers. Throughout the specification, the mutual capacitance $C_{mn}$ at the node $N_{mn}$ may denote the mutual capacitance $C_{mn}$ between the $m^{th}$ driving electrode Txm and the $n^{th}$ sensing electrode Rxn.

A plurality of channel areas of the touchpad TP may be defined by the driving electrodes Tx and the sensing electrodes Rx. For example, the channel areas may be rectangular areas surrounded by the driving electrodes Tx and the sensing electrodes Rx. In addition, each of the channel areas may correspond to respective nodes. For example, a channel area $CH_{11}$ may correspond to a node $N_{11}$.

According to a comparative exemplary embodiment, different driving signals may be sequentially applied to each of the driving electrodes Tx for measuring the mutual capacitance at each of the plurality of nodes. In addition, the electrical signal may be individually measured at each of the sensing electrodes Rx. For example, when the mutual capacitance $C_{11}$ is measured, the driving signal may be applied only to the first driving electrode Tx1 and the electrical signal may be measured at the first sensing electrode Rx1. Similarly, when the mutual capacitance $C_{mn}$ is measured, the driving signal may be applied only to the $m^{th}$ driving electrode Txm and the electrical signal may be measured at the $n^{th}$ sensing electrode Rxn.

According to the comparative exemplary embodiment described above, the driving signal may be applied only to one of the driving electrodes Tx for measuring the mutual capacitance at each node. In the case of the fingerprint sensor having high resolution, the distances between the driving electrodes Tx may be very small. As the distances between the driving electrodes Tx decreases, an area of a channel CH activated during a time of measuring the mutual capacitance may decrease. In addition, as the area of the activated channel CH decreases, strength of an obtained electrical signal may decrease. In addition, a magnitude of the mutual capacitance measured at respective nodes may decrease. Accordingly, a change in the mutual capacitance at respective nodes may not be accurately detected. Accordingly, a sensitivity of the fingerprint sensor may decrease.

For increasing the sensitivity, the driver DU of the fingerprint sensor may group the plurality of driving electrodes Tx into a plurality of driving groups and sequentially apply the driving signals to each of the plurality of driving groups, according to an exemplary embodiment. Each of the plurality of driving groups may include at least two driving electrodes Tx.

Figure 3:
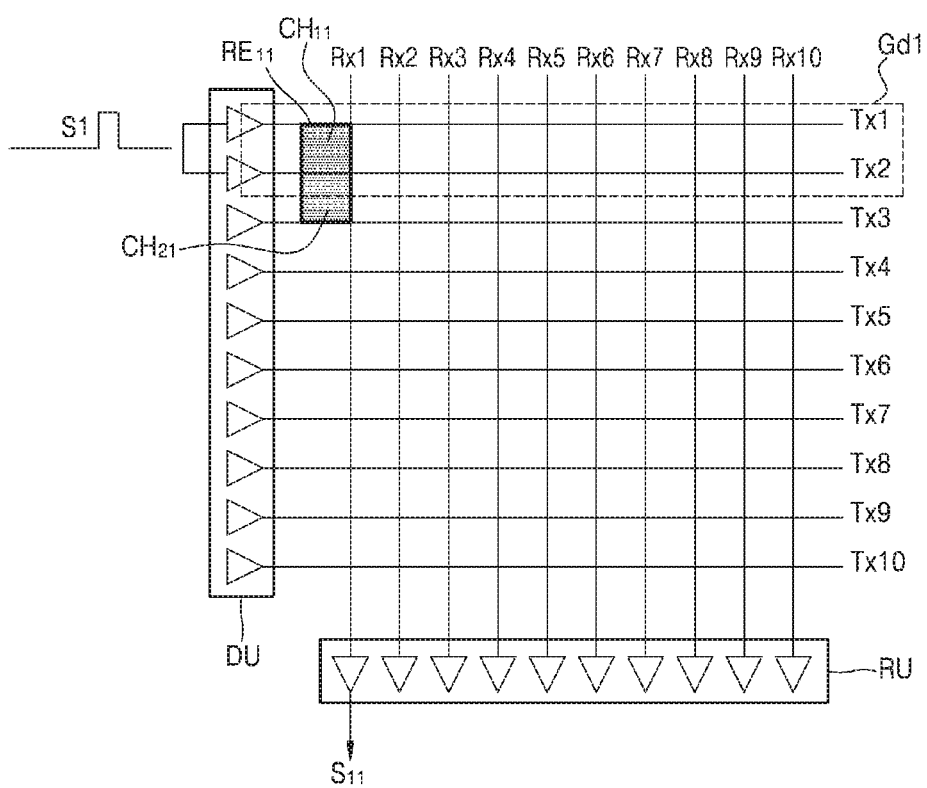
FIG. 3 is a conceptual drawing illustrating a driver applying a driving signal to a driving group into which driving electrodes are grouped.

FIG. 3 is a conceptual drawing illustrating the driver DU applying a first driving signal S1 to a first driving group Gd1 including driving electrodes Tx1 and Tx2.

Referring to FIG. 3, the driver DU may group the first and second driving electrodes Tx1 and Tx2 and apply the first driving signal S1 thereto. For example, the driver DU may group the first and second driving electrodes Tx1 and Tx2 into the first driving group Gd1. Then, the driver DU may apply the first driving signal S1 to the first driving group Gd1. For example, the driver DU may apply the same voltage pulse to the first driving group Gd1.

The signal measurement unit RU may individually measure the electrical signal at each of the plurality of sensing electrodes Rx. When the driving group includes n driving electrodes Tx and the signal measurement unit RU measures the electrical signal at one sensing electrode Rx, an activated area of the touchpad TP may include n×1 channels. n is an arbitrary natural number. For example, as illustrated in FIG. 1, when the first driving group Gd1 includes the first driving electrode Tx1 and the second driving electrode Tx2, and the signal measurement unit RU measures an electrical signal $S_{11}$ on the first sensing electrode Rx1, an activated area $RE_{11}$ may include two channels $CH_{11}$ and $CH_{21}$. An activated area $RE_{mn}$ may denote an area activated by an $m^{th}$ driving group Gdm and the $n^{th}$ sensing electrode Rxn. In addition, an electrical signal $S_{mn}$ may denote the electrical signal measured by the signal measurement unit RU when the activated area $RE_{mn}$ is activated. In addition, a gross mutual capacitance $GC_{mn}$ may denote the mutual capacitance obtained from the electrical signal $S_{mn}$ in the activated area $RE_{mn}$.

As described above, after the first driving signal S1 is applied to the first driving group Gd1, a gross mutual capacitance $GC_{11}$ in the activated area $RE_{11}$ may be obtained from the electrical signal $S_{11}$ measured at the first sensing electrode Rx1. The gross mutual capacitance $GC_{11}$ in the activated area $RE_{11}$ may include a combination of the mutual capacitance $C_{11}$ corresponding to the channel $CH_{11}$ and the mutual capacitance $C_{21}$ corresponding to the channel $CH_{21}$.

As illustrated in FIG. 3, when the driver DU applies the driving signal to the driving group Gd into which the plurality of driving electrodes Tx are grouped and the electrical signal is measured by the signal measurement unit RU, the number of channels including the activated areas RE may increase. Accordingly, the strength of the electrical signal measured by the signal measurement unit RU may increase. Thus, the sensitivity of the fingerprint sensor may be enhanced.

When the driver DU applies the first driving signal S1 to the first driving group Gd1, the signal measurement unit RU may sequentially measure the electrical signal at each of the plurality of sensing electrodes Rx.

Figure 4:
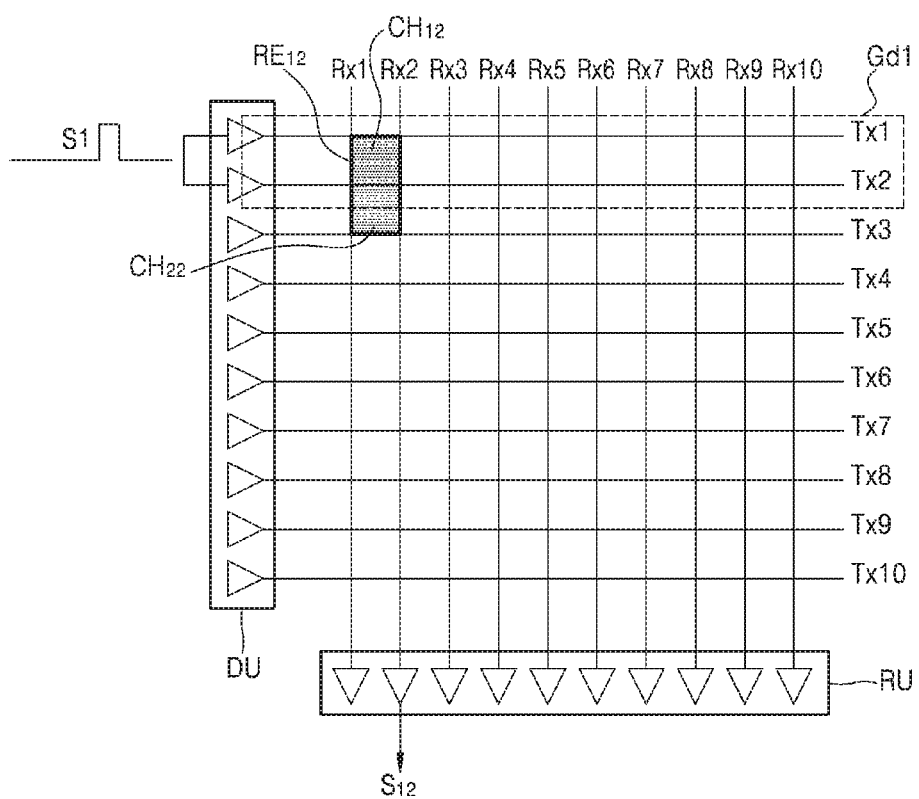
FIG. 4 illustrates a signal measurement unit measuring an electrical signal at a second sensing electrode.

FIG. 4 illustrates the signal measurement unit RU measuring an electrical signal $S_{21}$ on a second sensing electrode Rx2.

Referring to FIG. 4, the signal measurement unit RU illustrated in FIG. 3 may change the sensing electrode Rx sensing the electrical signal. For example, the signal measurement unit RU may sequentially change the order numbers of the sensing electrodes Rx measuring electrical signals. When the signal measurement unit RU changes the sensing electrode Rx measuring the electrical signal, the activated area $RE_{12}$ may be also changed. As the signal measurement unit RU changes the order numbers of the sensing electrodes Rx measuring electrical signals, the activated area $RE_{nm}$ may move in a horizontal direction.

Figure 5:
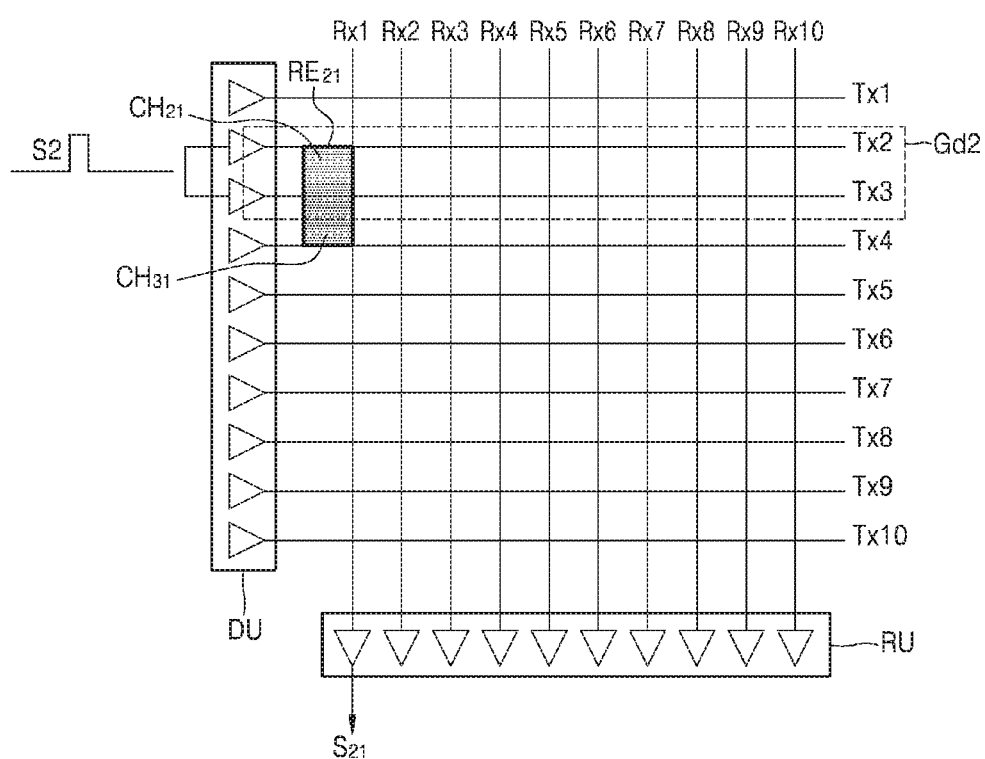
FIG. 5 illustrates the driver applying the driving signal to a second driving group different from a first driving group in FIG. 3.

FIG. 5 illustrates the driver DU applying a second driving signal S2 to a second driving group Gd2 different from the first driving group Gd1 in FIG. 3.

Referring to FIG. 5, the driver DU may apply the second driving signal S2 to the second driving group Gd2 at a later time than a time when the driver DU applies the first driving signal S1 to the first driving group Gd1. Accordingly, a pulse peak of the second driving signal S2 applied to the second driving group Gd2 may be delayed from the pulse peak of the first driving signal S1 applied to the first driving group Gd1. The activated area $RE_{11}$ that is activated when the first signal S1 is applied to the first driving group Gd1 and the activated area $RE_{21}$ activated when the second signal S2 is applied to the second driving group Gd2 may include the channel $CH_{12}$ wherein the activated area $RE_{11}$ and the activated area $RE_{21}$ mutually overlap.

As illustrated in FIG. 5, whenever the order number of the driving group Gd is changed, the driver DU may sequentially change the order numbers of the driving electrodes included in the driving group Gd. According to an exemplary embodiment, as the order number of the driving group Gd increases by one, the driver DU may further increase the order numbers of the driving electrodes Tx by one. In other words, as illustrated in FIGS. 4 and 5, when the first driving group Gd1 includes the first and second driving electrodes Tx1 and Tx2, the second driving group Gd2 may include the second driving electrode Tx2 and a third driving electrode Tx3. That is, an arbitrary $n^{th}$ driving group Gdn may include $n^{th}$ and $(n+1)^{th}$ driving electrodes Txn and Tx(n+1).

Figure 6:
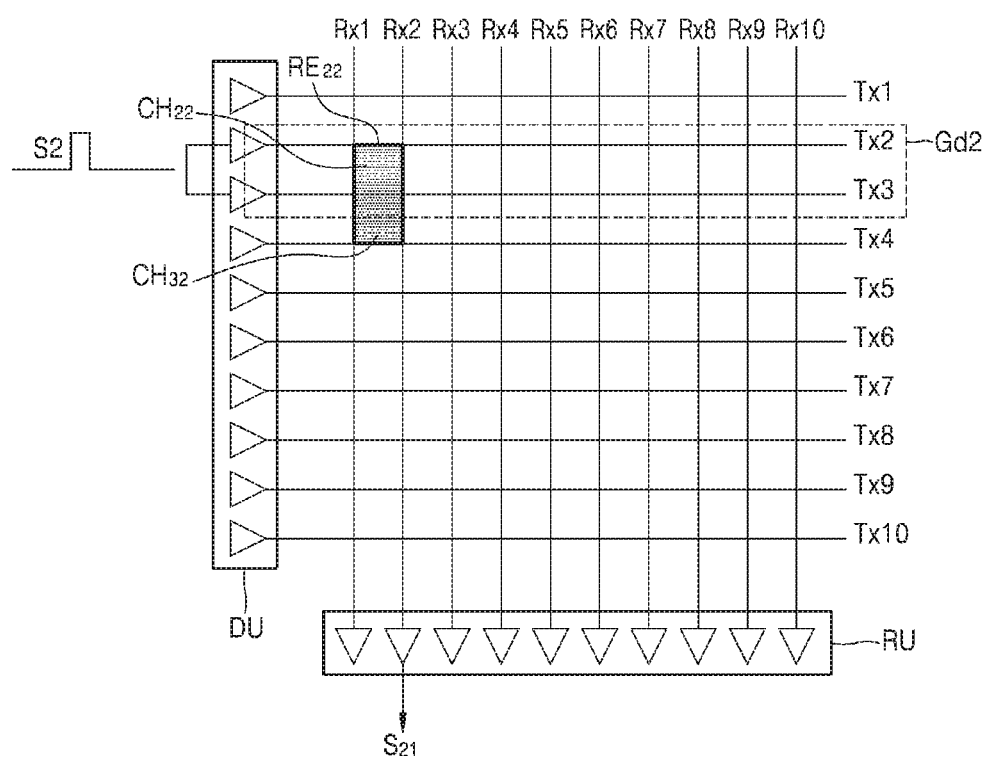
FIG. 6 illustrates an example wherein the signal measurement unit changes an order number of the sensing electrode sensing the electrical signal in FIG. 5.

FIG. 6 illustrates an example wherein the signal measurement unit RU changes the order number of the sensing electrode Rx sensing the electrical signal in FIG. 5.

Referring to FIG. 6, a location of an activated area $RE_{22}$ may move in the horizontal direction from the location of the activated area $RE_{21}$ illustrated in FIG. 5, as the signal measurement unit RU changes the order numbers of the sensing electrodes Rx outputting electrical signals. A gross mutual capacitance $GC_{22}$ in the activated area $RE_{22}$ may be obtained from the electrical signal $S_{21}$ measured in FIG. 6.

As illustrated above in FIGS. 3 through 6, the activated area RE may move in a vertical direction as the driver DU changes the order number of the driving group Gd to which the driver DU applies the driving signal. In addition, the activated area RE may move in the horizontal direction as the signal measurement unit RU changes the order numbers of the sensing electrodes Rx measuring electrical signals.

Hitherto, each of the plurality of driving groups Gd has been provided with the order number. However, the order number may not limit a sequence in which the driving signal is applied. For example, the driver DU may apply the driving signal to the first driving group Gd1, and then, the driving signal to a third driving group Gd3 and the driving signal to the second driving group Gd2.

In addition, in FIGS. 3 through 6, each of the driving groups Gd is illustrated as including two driving electrodes Tx. However, the exemplary embodiment is not limited thereto. For example, the driving group Gd may include (k+1) driving electrodes Tx. k is an arbitrary natural number. For example, the $n^{th}$ driving group Gdn may include $n^{th}$ to $(n+k)^{th}$ driving electrodes Txn, . . . , and Tx(n+k).

In FIGS. 3 through 6, the signal measurement unit RU is illustrated as individually outputting the electrical signal from each of the plurality of sensing electrodes Rx. However, the exemplary embodiment is not limited thereto. For example, the signal measurement unit RU may group the plurality of sensing electrodes Rx into a plurality of sensing groups and sequentially measure the electrical signal output from each of the plurality of the sensing groups.

Figure 7:
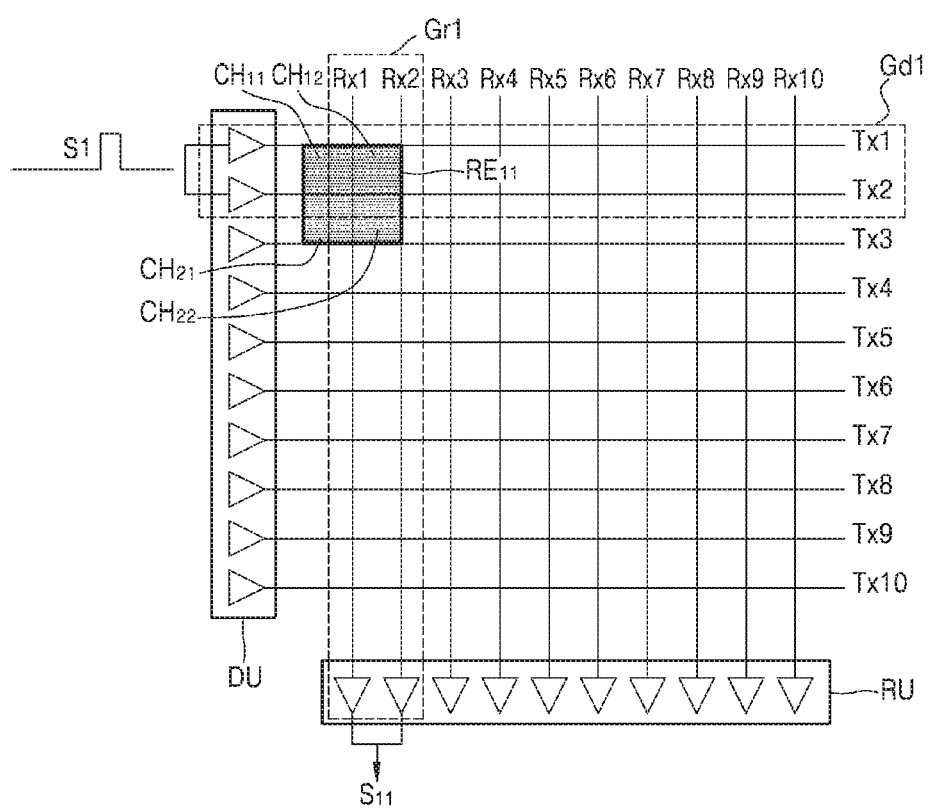
FIG. 7 illustrates an example wherein a sensing group includes two sensing electrodes.

FIG. 7 illustrates an example wherein a sensing group Gr includes two sensing electrodes Rx.

Referring to FIG. 7, the signal measurement unit RU may group two sensing electrodes Rx into the sensing group Gr. The signal measurement unit RU may group the first and second sensing electrodes Rx1 and Rx2 into a first sensing group Gr1 and measure the electrical signal output from the first sensing group Gr1. In other words, the signal measurement unit RU may output the electrical signal wherein electrical signals output from each of the first and second electrodes Rx1 and Rx2 included in the first sensing group Gr1 are combined.

As illustrated in FIG. 7, when the first driving group Gd1 includes two driving electrodes Tx1 and Tx2, and the first sensing group Gr1 includes two sensing electrodes Rx1 and Rx2, the activated area $RE_{11}$ may include 2×2 channels via the first driving group Gd1 and the first sensing group Gr1. As illustrated in FIG. 7, when the signal measurement unit RU groups the plurality of sensing electrodes Rx into the sensing group Gr and measures the electrical signal from the sensing group Gr, a size of the activated area RE, which is activated when the electrical signal is measured, may increase. Thus, the strength of the measured electrical signal may increase and the gross mutual capacitance in the activated area RE may be adequately obtained.

Figure 8:
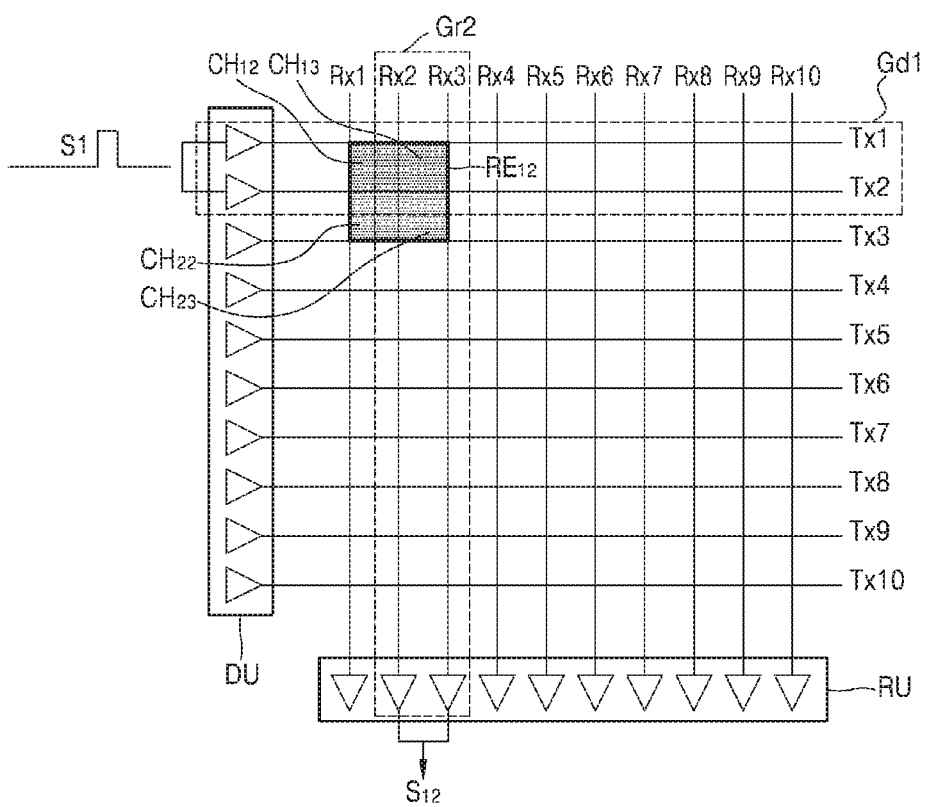
FIG. 8 illustrates an example wherein the signal measurement unit changes the order number of the sensing group sensing the electrical signal.

FIG. 8 illustrates an example wherein the signal measurement unit RU changes the order number of the sensing group Gr sensing the electrical signal.

Referring to FIG. 8, the signal measurement unit RU may measure the electrical signal output from a second sensing group Gr2. The second sensing group Gr2 may include the second sensing electrode Rx2 and a third sensing electrode Rx3. The signal measurement unit RU may sequentially change the order number of the sensing group Gr measuring the electrical signal. As the signal measurement unit RU changes the order number of the sensing group Gr measuring the electrical signal, the location of the activated area RE may move in the horizontal direction. The activated area $RE_{12}$ that is activated by the second sensing group Gr2 may include channels $CH_{12}$, $CH_{13}$, $CH_{22}$, $CH_{23}$. Accordingly, the activated area $RE_{12}$ may overlap with the activated area $RE_{11}$ which is activated by the first sensing group Gr1 and includes $CH_{11}$, $CH_{12}$, CH21, and $CH_{22}$.

The signal measurement unit SU may sequentially change the order numbers of the sensing electrodes Rx included in the sensing group Gr as the order number of the sensing group Gr changes. As an example, the signal measurement unit SU may further increase the order numbers of the sensing electrodes Rx included in the sensing group Gr by one as the order number of the sensing group Gr increases by one. In other words, as illustrated in FIGS. 4 and 5, when the first sensing group Gr1 includes the first and second sensing electrodes Rx1 and Rx2, the second sensing group Gr2 may include the second and third sensing electrodes Rx2 and Rx3. That is, an arbitrary $n^{th}$ sensing group Grn may include an $n^{th}$ sensing electrode Txn and $(n+1)^{th}$ sensing electrode Tx(n+1).

Figure 9:
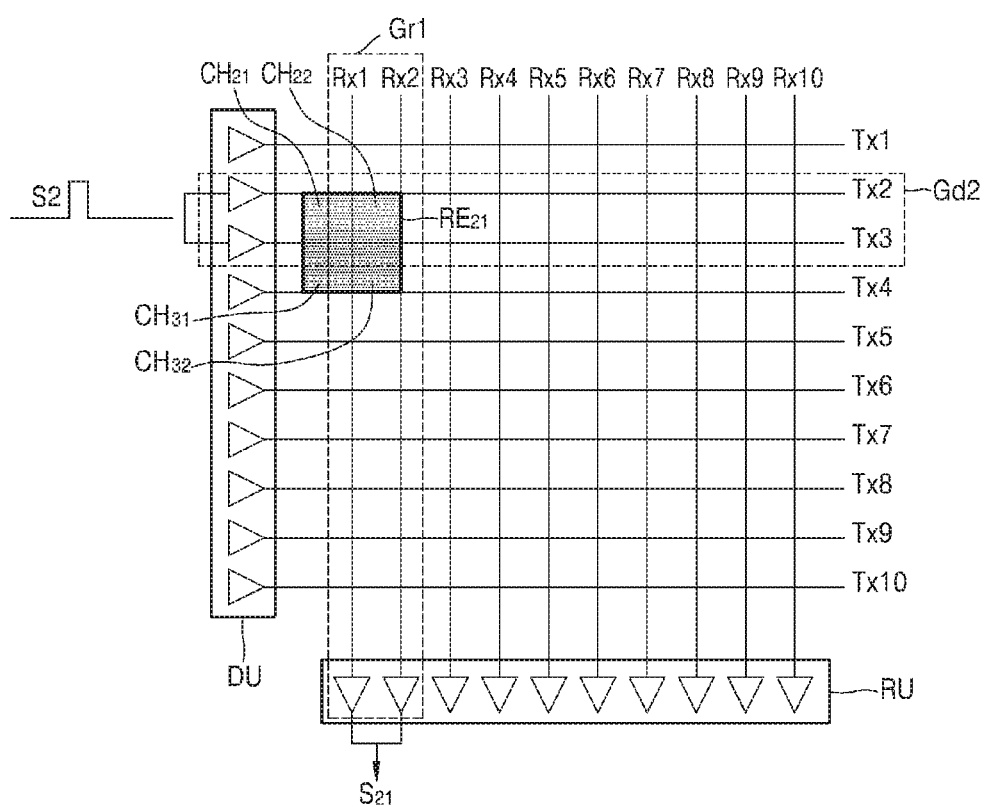
FIG. 9 illustrates an example wherein the driver changes the order number of the driving group applying the driving signal in FIG. 7.

FIG. 9 illustrates an example wherein the driver DU changes the order number of the driving group Gd applying the driving signal in FIG. 7.

Referring to FIG. 9, the driver DU may apply the second driving signal S2 to the second driving group Gd2 different from the first driving group Gd1. The driver DU may apply the second driving signal S2 to the second driving group Gd2 at a later time than a time when the driver DU applies the first driving signal S1 to the first driving group Gd1. Accordingly, the pulse peak of the second driving signal S2 applied to the second driving group Gd2 may be delayed from the pulse peak of the first driving signal S1 applied to the first driving group Gd1. The activated area $RE_{21}$ which is activated by the second driving group Gd2 may include channels $CH_{21}$, $CH_{22}$, $CH_{31}$, and $CH_{32}$. Accordingly, the activated area $RE_{21}$ overlaps with the activated area $RE_{11}$ which is activated by the first driving group Gd1 and includes $CH_{12}$, $CH_{13}$, $CH_{21}$, and $CH_{22}$. As the driver DU changes the order number of the driving group Gd applying the electrical signal, the location of the activated area RE may move in the vertical direction.

Hitherto, each of the plurality of sensing groups Gr has been provided with the order number. However, the order number may not limit a sequence wherein the signal measurement unit RU measures the electrical signal. For example, the signal measurement unit RU may measure the electrical signal output from the first sensing group Gr1, and then, the electrical signal from a third sensing group Gr3 and the electrical signal from the second sensing group Gr2.

In addition, in FIGS. 7 through 9, each of the sensing groups Gr is illustrated as including two sensing electrodes Rx. However, the exemplary embodiment is not limited thereto. For example, the sensing group Gr may include (k+1) of sensing electrodes Rx. k is an arbitrary natural number. For example, the $n^{th}$ sensing group Grn may include $n^{th}$ to $(n+k)^{th}$ sensing electrodes Rxn, . . . , and Rx(n+k).

Figure 10:
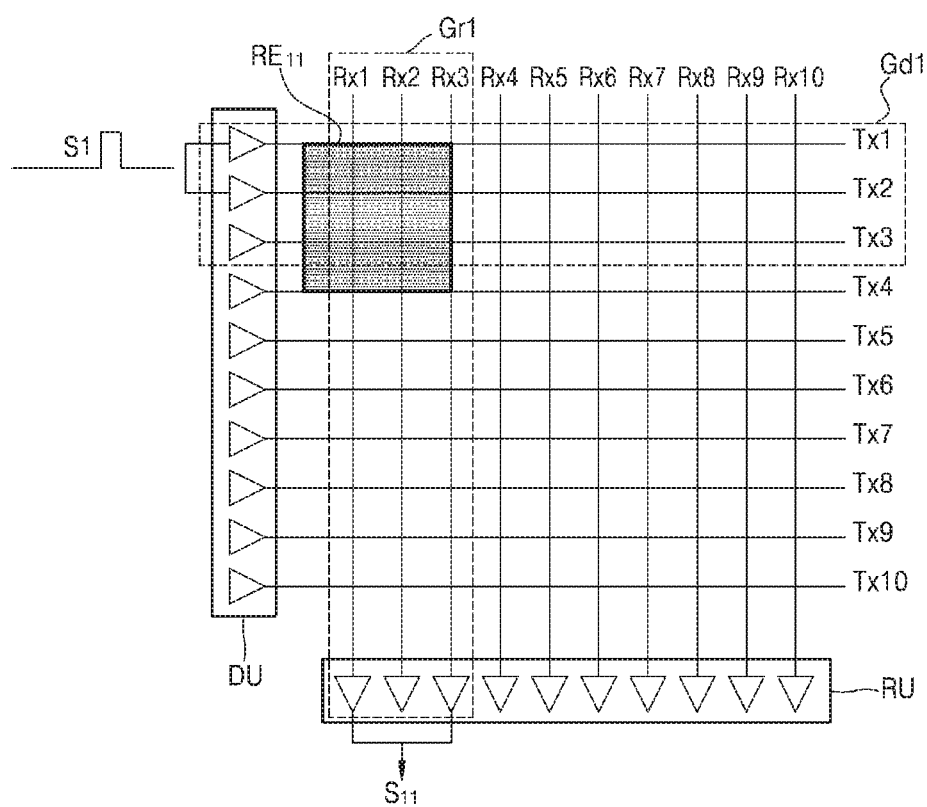
FIG. 10 illustrates an example wherein an activated area includes 3×3 channels.

FIG. 10 illustrates an example wherein the activated area RE includes 3×3 channels. Referring to FIG. 10, the driving group Gd may include three driving electrodes Tx and the sensing group Gr may include three sensing electrodes Rx. For example, the first driving group Gd1 may include the first through third driving electrodes Tx1, Tx2, and Tx3, and the first sensing group Gr1 may include the first through third sensing electrodes Rx1, Rx2, and Rx3. In addition, the activated area $RE_{11}$ that is activated by the first driving group Gd1 and the first sensing group Gr1 may include 3×3 channels.

Hitherto, examples of grouping the driving electrodes Tx and the sensing electrodes Rx have been described with reference to FIGS. 7 through 10. However, exemplary embodiments described above are only exemplary and not limited thereto. For example, the number of the driving electrodes Tx included in the driving group Gd and the number of the sensing electrodes Rx included in the sensing group Gr may be different from the numbers described above.

Referring to FIG. 1 again, the fingerprint sensor according to an exemplary embodiment may further include a processor PU which calculates the mutual capacitance from the electrical signal measured by the signal measurement unit SU, at each of the plurality of nodes at which each of the plurality of driving electrodes Tx intersect with each of the plurality of sensing electrodes Rx. The processor PU may include hardware components which perform calculation operations for calculating the mutual capacitance at each of the plurality of nodes.

The processor PU may calculate the mutual capacitance at a certain node based on the location of the certain node. The processor PU may differently determine the weight of the mutual capacitance measured in each of the plurality of driving groups Gd based on the location of the certain node. In addition, the processor PU may differently determine the weight of the mutual capacitance measured at each of the plurality of sensing electrodes Rx. In other words, the processor PU may differently determine the weight of the gross mutual capacitance $GC_{mn}$ in the activated area $RE_{mn}$ that is activated by each of the plurality of driving groups Gdm and each of the plurality of sensing electrodes Rxn.

Figure 11:
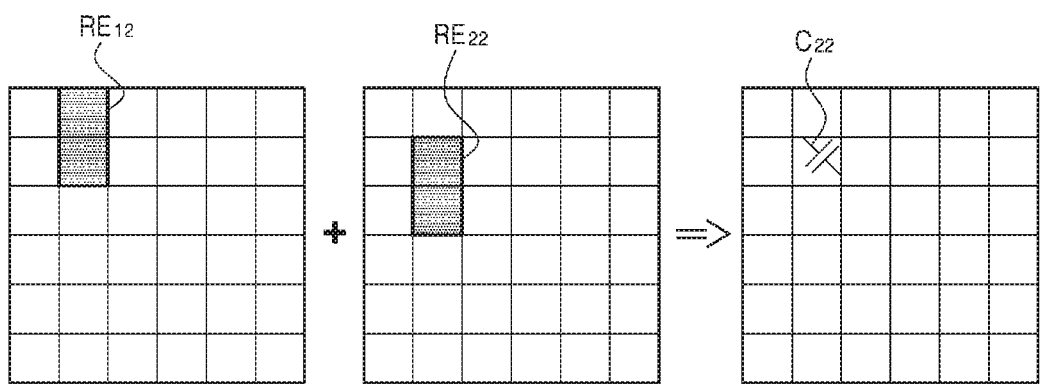
FIG. 11 illustrates a process of calculating the mutual capacitance at a certain node by a processor.

FIG. 11 illustrates a process of calculating a mutual capacitance $C_{22}$ at a certain node $N_{22}$ by the processor PU.

FIG. 11 illustrates a case in which the activated area RE includes 2×1 channels, as illustrated in FIGS. 3 through 6. Referring to FIG. 11, the activated areas $RE_{12}$ and $RE_{22}$ may include the channel $CH_{22}$ corresponding to the node $N_{22}$. The processor PU may calculate a gross mutual capacitance $GC_{12}$ in the activated area $RE_{12}$ from the electrical signal $S_{12}$ which is measured at the second sensing electrode Rx2 by the signal measurement unit SU after the driver DU has applied the first driving signal S1 to the first driving group Gd1. In addition, the processor PU may calculate the gross mutual capacitance $GC_{22}$ in the activated area $RE_{22}$ from the electrical signal $S_{22}$ which is measured at the second sensing electrode Rx2 by the signal measurement unit SU after the driver DU has applied the second driving signal S2 to the second driving group Gd2.

Since the weight of the channel $CH_{22}$ in the activated area $RE_{12}$ is ½ and the weight of the channel $CH_{22}$ in the activated area $RE_{22}$ is ½, the processor PU may calculate the mutual capacitance $C_{22}$ via Formula 1.

$$C_{22} = \frac{GC_{12} + GC_{22}}{2} \qquad \text{[Formula 1]}$$

As shown in Formula 1, the processor PU may determine the weight of the gross mutual capacitance $GC_{12}$, as ½, which is obtained via a combination of the first driving group Gd1 and the second sensing electrode Rx2. In addition, the processor PU may determine the weight of the gross mutual capacitance $GC_{22}$, as ½, which is obtained via a combination of the second driving group Gd2 and the second sensing electrode Rx2. In addition, the processor PU may determine weights of other gross mutual capacitances, as 0, which are obtained via combinations of other driving groups Gd and sensing electrodes Rx, which are different from the two combinations described above.

Figure 12:
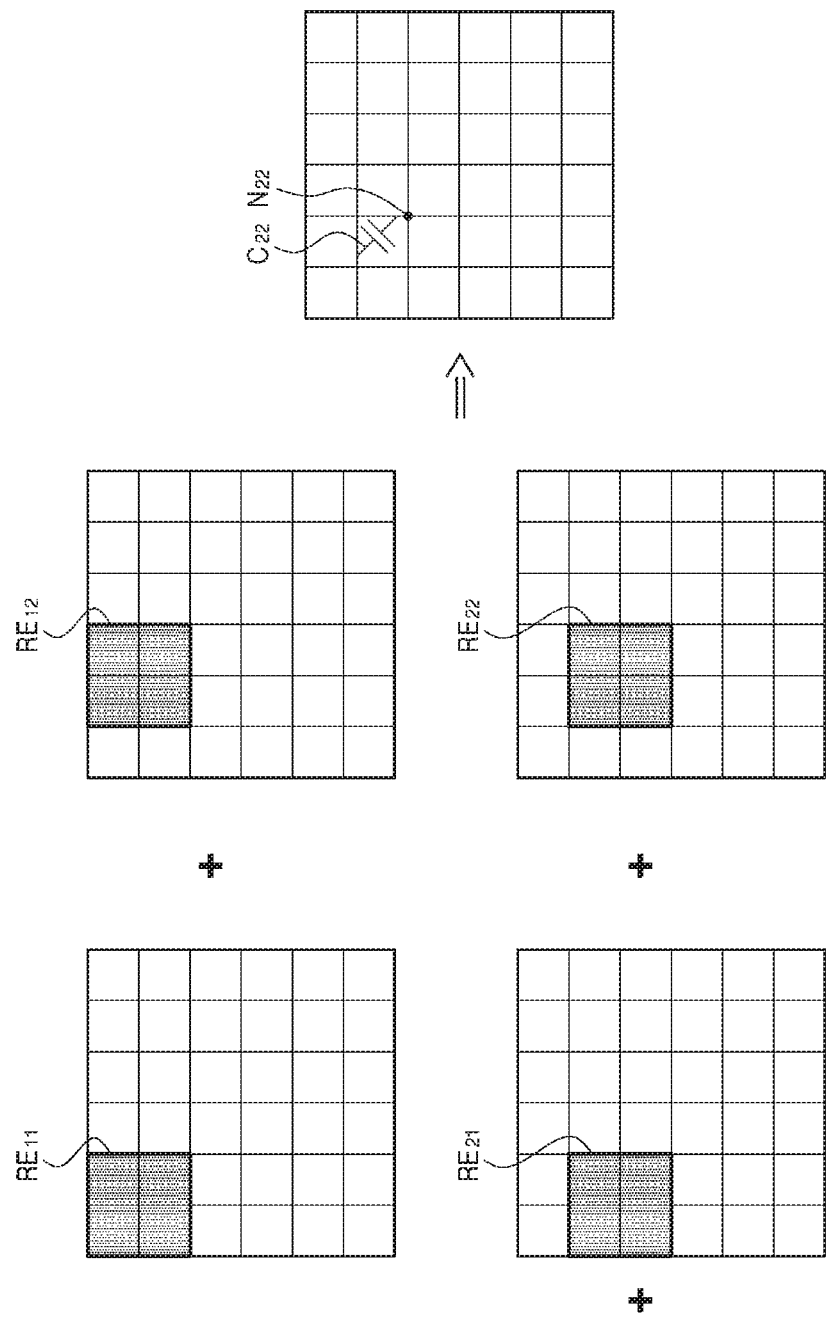
FIG. 12 illustrates another example wherein the processor calculates the mutual capacitance at the certain node.

FIG. 12 illustrates another process of calculating the mutual capacitance $C_{22}$ at the certain node $N_{22}$ by the processor PU.

FIG. 12 illustrates a case in which the activated area RE includes 2×2 channels, as illustrated in FIGS. 7 through 9. Referring to FIG. 12, the activated areas $RE_{11}$, $RE_{12}$, $RE_{21}$, and $RE_{22}$ may respectively include the channel $CH_{22}$ corresponding to the node $N_{22}$. The processor PU may calculate the gross mutual capacitances $GC_{11}$, $GC_{12}$, $GC_{21}$, and $GC_{22}$ in respective activated areas $RE_{11}$, $RE_{12}$, $RE_{21}$, and $RE_{22}$ from the electrical signals which are obtained via the driving groups Gr and the sensing groups Gr that correspond to respective activated areas $RE_{11}$, $RE_{12}$, $RE_{21}$, and $RE_{22}$. In addition, since the weight of the channel $CH_{22}$ is ¼ in respective activated areas $RE_{11}$, $RE_{12}$, $RE_{21}$, and $RE_{22}$, the processor PU may determine the weight of respective gross mutual capacitances $GC_{11}$, $GC_{12}$, $GC_{21}$, and $GC_{22}$, as ¼.

For example, the processor PU may calculate the mutual capacitance $C_{22}$ via Formula 2.

$$C_{22} = \frac{GC_{11} + GC_{12} + GC_{21} + GC_{22}}{4} \quad [\text{Formula 2}]$$

As shown in Formula 2, the processor PU may determine the weight of respective the gross mutual capacitances $GC_{11}$, $GC_{12}$, $GC_{21}$, and $GC_{22}$, as ¼, which are obtained via combinations of the driving groups Gd and the sensing groups Gr that correspond to respective activated areas $RE_{11}$, $RE_{12}$, $RE_{21}$, and $RE_{22}$. In addition, the processor PU may determine weights of other gross mutual capacitances, as 0, which are obtained via combinations of other driving groups Gd and sensing groups Gr, which do not correspond to the activated areas $RE_{11}$, $RE_{12}$, $RE_{21}$, and $RE_{22}$.

Figure 13:
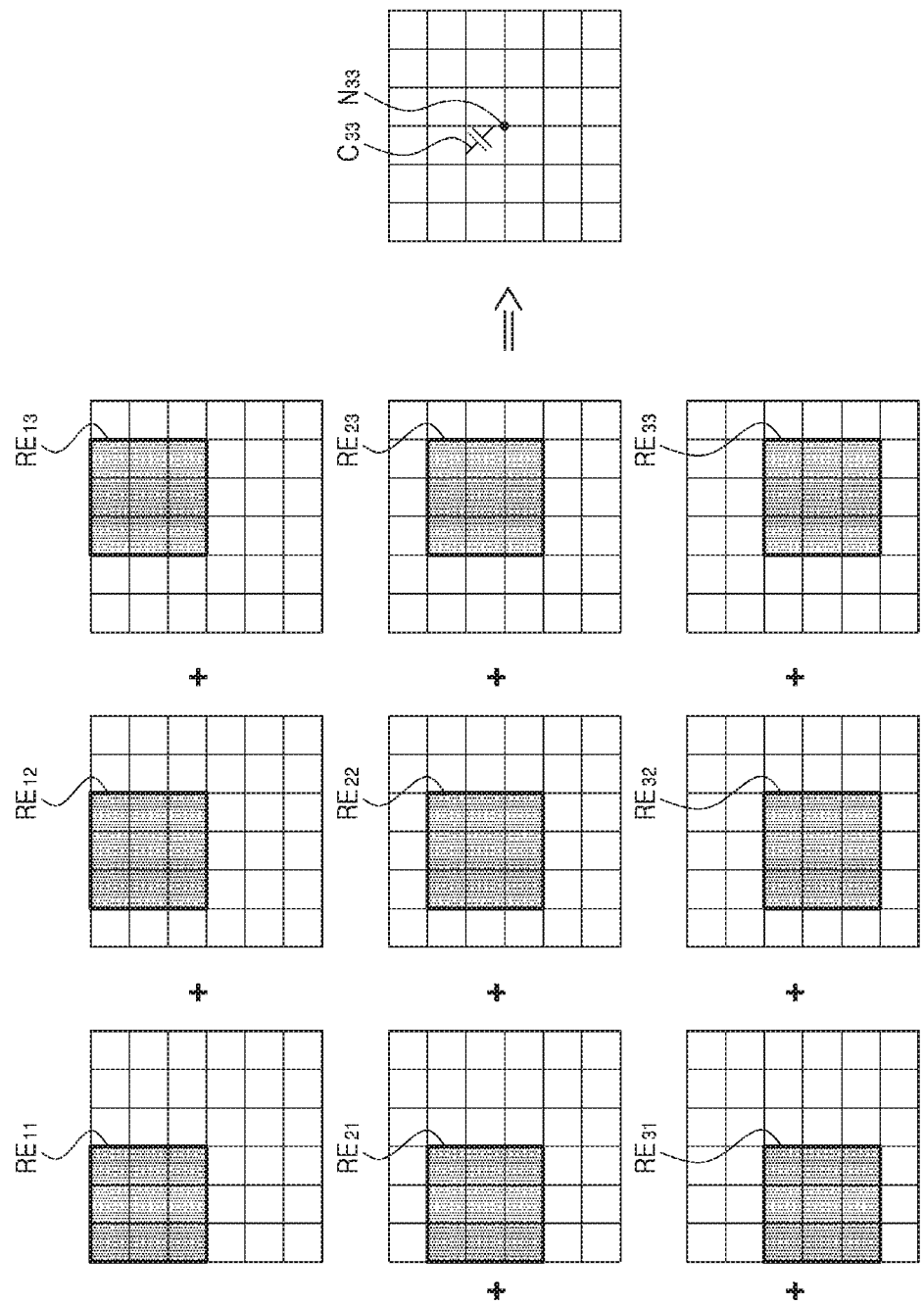
FIG. 13 illustrates another example wherein the processor calculates the mutual capacitance at the certain node.

FIG. 13 illustrates a process of calculating a mutual capacitance $C_{33}$ at a certain node $N_{33}$ by the processor PU.

FIG. 13 illustrates a case wherein the activated area RE includes 3×3 channels, as illustrated in FIG. 10. Referring to FIG. 13, each of the activated areas $RE_{11}$, $RE_{12}$, $RE_{13}$, $RE_{21}$, $RE_{22}$, $RE_{23}$, $RE_{31}$, $RE_{32}$, and $RE_{33}$ may include a channel $CH_{33}$. The processor PU may calculate gross mutual capacitances $GC_{11}$, $GC_{12}$, $GC_{13}$, $GC_{21}$, $GC_{22}$, $GC_{23}$, $GC_{31}$, $GC_{32}$, and $GC_{33}$ in respective activated areas $RE_{11}$, $RE_{12}$, $RE_{13}$, $RE_{21}$, $RE_{22}$, $RE_{23}$, $RE_{31}$, $RE_{32}$, and $RE_{33}$ from the electrical signals which are obtained via the driving groups Gd and the sensing groups Gr that correspond to respective activated areas $RE_{11}$, $RE_{12}$, $RE_{13}$, $RE_{21}$, $RE_{22}$, $RE_{23}$, $RE_{31}$, $RE_{32}$, and $RE_{33}$. In addition, since the weight of the channel $CH_{33}$ in respective activated areas $RE_{11}$, $RE_{12}$, $RE_{13}$, $RE_{21}$, $RE_{22}$, $RE_{23}$, $RE_{31}$, $RE_{32}$, and $RE_{33}$ is ⅑, the processor PU may determine the weight of respective gross mutual capacitances $GC_{11}$, $GC_{12}$, $GC_{13}$, $GC_{21}$, $GC_{22}$, $GC_{23}$, $GC_{31}$, $GC_{32}$, and $GC_{33}$, as ⅑.

For example, the processor PU may calculate the mutual capacitance $C_{33}$ via Formula 3.

$$C_{33} = \frac{GC_{11} + GC_{12} + GC_{13} + GC_{21} + GC_{22} + GC_{23} + GC_{31} + GC_{32} + GC_{33}}{9} \quad [\text{Formula 3}]$$

As shown in Formula 3, the processor PU may determine the weight of respective the gross mutual capacitances $GC_{11}$, $GC_{12}$, $GC_{13}$, $GC_{21}$, $GC_{22}$, $GC_{23}$, $GC_{31}$, $GC_{32}$, and $GC_{33}$, as ⅑, which are obtained via combinations of the driving groups Gd and the sensing groups Gr that correspond to respective activated areas $RE_{11}$, $RE_{12}$, $RE_{13}$, $RE_{21}$, $RE_{22}$, $RE_{23}$, $RE_{31}$, $RE_{32}$, and $RE_{33}$. In addition, the processor PU may determine weights of other gross mutual capacitances, as 0, which are obtained via combinations of other driving groups Gd and sensing groups Gr, which do not correspond to the activated areas $RE_{11}$, $RE_{12}$, $RE_{13}$, $RE_{21}$, $RE_{22}$, $RE_{23}$, $RE_{31}$, $RE_{32}$, and $RE_{33}$.

The processor PU may determine the weights of the gross mutual capacitances $GC_{11}$, $GC_{12}$, $GC_{13}$, $GC_{21}$, $GC_{22}$, $GC_{23}$, $GC_{31}$, $GC_{32}$, and $GC_{33}$, as not all the same as ⅑ but values different from each other. For example, since the channel $CH_{33}$ is located at the center of the activated area $RE_{22}$, the gross mutual capacitance $GC_{22}$ in the activated area $RE_{22}$ may have a relatively higher contribution to the mutual capacitance $C_{33}$ at the node $N_{33}$ than other gross mutual capacitances. Thus, the processor PU may allocate a higher weight to the gross mutual capacitance $GC_{22}$ in the activated area $RE_{22}$.

For example, the processor PU may calculate the mutual capacitance $C_{33}$ via Formula 4.

$$C_{33} = \frac{GC_{11} + GC_{12} + GC_{13} + GC_{21} + w \cdot GC_{22} + GC_{23} + GC_{31} + GC_{32} + GC_{33}}{w + 8} \quad [\text{Formula 4}]$$

In Formula 4, w may denote an arbitrary real number larger than about 1. In Formula 4, as the magnitude of w becomes larger, the weight of the gross mutual capacitance $GC_{22}$ in the activated area $RE_{22}$ may further increase.

Figure 14:
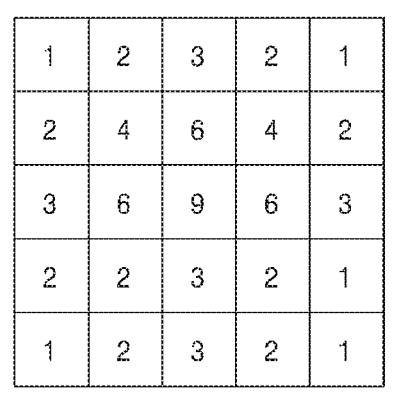

FIG. 14 illustrates the number of overlapping times of the channels after respective channels has been repeated in the activated areas $RE_{11}$, $RE_{12}$, $RE_{13}$, $RE_{21}$, $RE_{22}$, $RE_{23}$, $RE_{31}$, $RE_{32}$, and $RE_{33}$ in FIG. 13. Referring to FIG. 14, the sums of the number of overlapping times of the channels included in respective activated areas $RE_{11}$, $RE_{12}$, $RE_{13}$, $RE_{21}$, $RE_{22}$, $RE_{23}$, $RE_{31}$, $RE_{32}$, and $RE_{33}$ may be different from each other. The processor PU may increase calculation accuracy by determining a larger weight for the activated area wherein the sum of the number of overlapping times of the channels is larger.

For example, the processor PU may calculate the mutual capacitance $C_{33}$ via Formula 5.

$$C_{33} = \frac{GC_{11} + w \cdot GC_{12} + GC_{13} + w \cdot GC_{21} + w^2 \cdot GC_{22} + w \cdot GC_{23} + GC_{31} + w \cdot GC_{32} + GC_{33}}{(w + 2)^2} \quad [\text{Formula 5}]$$

In Formula 5, w may denote the arbitrary real number larger than about 1.

The Formula 5 may be expressed in a general form as Formula 6.

$$C_{mn} = [GC_{(m-2)(n-2)} + w \cdot GC_{(m-2)(n-1)} + GC_{(m-2)(n)} + w \cdot GC_{(m-1)(n-2)} + w^2 \cdot GC_{(m-1)(n-1)} + w \cdot GC_{(m-1)(n)} + \quad [\text{Formula 6}]$$

$$GC_{(m)(n-2)} + w \cdot GC_{(m)(n-1)} + GC_{(m)(n)}] \times \frac{1}{(w+2)^2}$$

In Formulas 5 and 6, as the magnitude of w increases, the weights of the activated areas adjacent to the node $N_{33}$ may relatively more increase.

In examples described above, the processor PU may calculate an approximate value of the mutual capacitance at the node via determining weights of the gross mutual capacitances in various activated areas RE. The fingerprint sensor may apply the predetermined fixed voltages to the certain channels of the touchpad TP and calculate the mutual capacitance at respective nodes via values of the predetermined fixed voltages, according to another exemplary embodiment.

FIG. 15 illustrates an example wherein an electrode ED of the fingerprint sensor applies the predetermined fixed voltage to a portion of the channels included on the touchpad. FIG. 15 illustrates a calculation process performed by the processor PU in a 2×1 measurement manner, as illustrated in FIGS. 3 through 6.

Referring to FIG. 15, the fingerprint sensor according to an exemplary embodiment may further include the electrode ED applying the predetermined fixed voltage to at least two channels among the plurality of channels formed on the touchpad TP. The electrode ED may include indium tin oxide (ITO).

The electrode ED may be connected to ground. In this case, the electrode ED may maintain voltages of the channels in contact therewith at a ground voltage. However, the exemplary embodiment is not limited thereto. The electrode ED may be connected to a certain power supply and maintain the voltage thereof at the predetermined fixed voltage via the power supply.

The electrode ED may apply the predetermined fixed voltage to the channels on an edge. For example, the electrode ED may apply the predetermined fixed voltage to the channels on the uppermost side of the touchpad TP. When the electrode ED is grounded, the predetermined fixed voltage may be the same as the ground voltage. However, the exemplary embodiment is not limited thereto. For example, when the electrode ED is connected to the certain power supply, the predetermined fixed voltage may be different from the ground voltage.

When the predetermined fixed voltage is continuously applied to the channels on the uppermost side of the touchpad TP, the mutual capacitances of the channels on the uppermost side may not change. In other words, the mutual capacitances on the uppermost side may be fixed regardless of a touch of the user's finger. The processor PU may calculate the mutual capacitance of the channel adjacent to the channel having the predetermined fixed voltage applied thereto, from the gross mutual capacitances in the areas which include the channels having the predetermined fixed voltage applied thereto and the channels adjacent to the channels having the predetermined fixed voltage applied thereto.

For example, the processor PU may calculate the gross mutual capacitance $GC_{12}$ in the activated area $RE_{12}$ which includes the channel $CH_{12}$ having the predetermined fixed voltage applied thereto and the channel $CH_{22}$ adjacent to the channel $CH_{12}$. In addition, the processor PU may calculate the mutual capacitance $C_{22}$ by subtracting the mutual capacitance of the channel $CH_{12}$ wherein the value thereof is fixed by the predetermined fixed voltage from the gross mutual capacitance $GC_{12}$ in the activated area $RE_{12}$. The processor PU may calculate the mutual capacitance $C_{22}$ via Formula 7.

$$C_{22} = GC_{12} - C_{12} \quad \text{[Formula 7]}$$

After the mutual capacitance $C_{22}$ has been calculated from Formula 7, the mutual capacitance $C_{32}$ of the channel $CH_{32}$ adjacent to the channel $CH_{22}$ may be inductively calculated. For example, the processor PU may calculate the gross mutual capacitance $GC_{22}$ in the activated area $RE_{22}$ including the channels $CH_{22}$ and $CH_{23}$. In addition, since the value of the mutual capacitance $C_{22}$ of the channel $CH_{22}$ is known from Formula 7, the processor PU may find the mutual capacitance $C_{32}$ of the channel $CH_{32}$ by subtracting the mutual capacitance $C_{22}$ of the channel $CH_{22}$ from the gross mutual capacitance $GC_{22}$ in the activated area $RE_{22}$.

Figure 16:
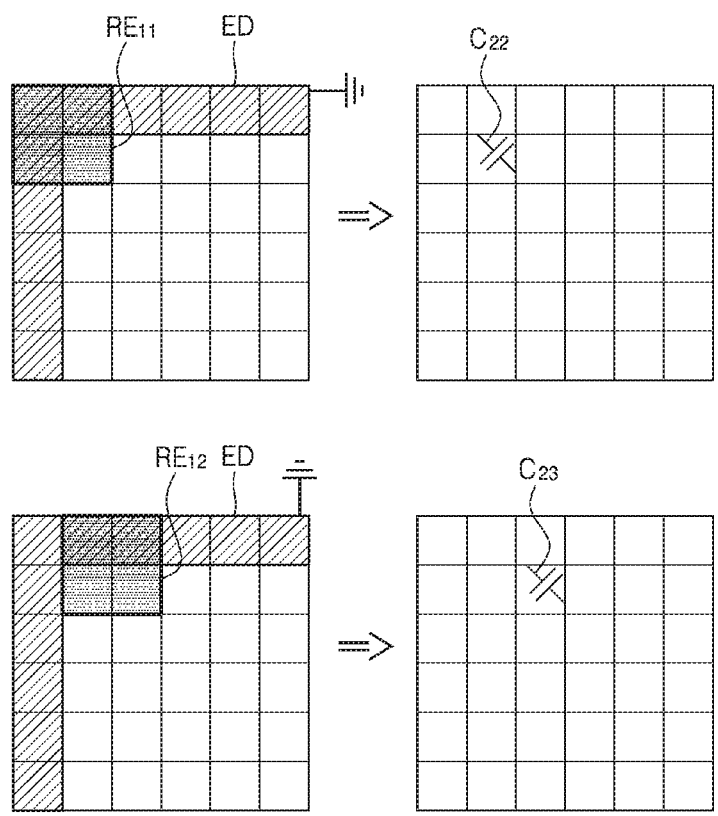
FIG. 16 illustrates another example wherein the electrode of the fingerprint sensor applies the predetermined fixed voltage to a portion of channels included on the touchpad.

FIG. 16 illustrates another example wherein the electrode ED of the fingerprint sensor applies the predetermined fixed voltage to a portion of the channels included on the touchpad TP. FIG. 16 illustrates a calculation process performed by the processor PU in a 2×2 measurement manner, as illustrated in FIGS. 7 through 9.

The electrode ED may apply the predetermined fixed voltage to the channels on top and left side edges of the touchpad TP. In this case, the mutual capacitances of channels on the top and left side edges of the touchpad TP may not change. As described above, the processor PU may find the mutual capacitance $C_{22}$ of the channel $CH_{22}$ by subtracting pre-known mutual capacitances $C_{11}$, $C_{12}$, and $C_{21}$ of respective channels $CH_{11}$, $CH_{12}$, and $CH_{21}$ from the gross mutual capacitance $GC_{11}$ in the activated area $RE_{11}$. In addition, the processor PU may also find, inductively, the mutual capacitance $C_{23}$ of another channel $CH_{23}$ from the mutual capacitance $C_{22}$ of the channel $CH_{22}$.

Hitherto, the fingerprint sensor and the method of driving the fingerprint sensor have been described with reference to FIGS. 1 through 16. The fingerprint sensor described above may be employed in a portable mobile communication device, a smart phone, etc.

According to exemplary embodiments, the size of the activated area RE that is activated at the time of measuring signals on the touchpad TP may increase via grouping the driving electrodes Tx and the sensing electrodes Rx. In addition, as the size of the activated area RE increases, the sensitivity of the fingerprint sensor may be enhanced. In addition, as the processor PU properly adjusts weights of the gross mutual capacitances GC in the activated areas RE at the time of calculating the mutual capacitance at each node, the accuracy of the fingerprint sensor may be enhanced. In addition, the processor PU may adequately calculate the mutual capacitance at respective nodes via applying the predetermined fixed voltage to the channels on edges of the touchpad TP.

According to exemplary embodiments, the size of the activated area RE that is activated at the time of measuring signals on the touchpad TP may increase via grouping the driving electrodes Tx. In addition, as the size of the activated area RE increases, the sensitivity of the fingerprint sensor may be enhanced.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A fingerprint sensor comprising:
a touchpad including a plurality of driving electrodes and a plurality of sensing electrodes, the plurality of sensing electrodes being disposed in a direction intersecting with the plurality of driving electrodes, the plurality of driving electrodes being divided into a plurality of driving groups;
a driver configured to sequentially apply a driving signal to each of the plurality of driving groups;
a signal measurement unit configured to measure electrical signals generated from the plurality of sensing electrodes in response to the driving signal; and
a processor configured to calculate mutual capacitance based on the electrical signals measured by the signal measurement unit, at each of a plurality of nodes at which each of the plurality of driving electrodes intersects with each of the plurality of sensing electrodes, by assigning different weights to gross mutual capacitances measured in each of the plurality of driving groups, based on a location of each of the plurality of nodes.

2. The fingerprint sensor of claim 1, wherein the signal measurement unit is further configured to sequentially measure the electrical signals output from each of the plurality of sensing electrodes.

3. The fingerprint sensor of claim 1,
wherein the signal unit is further configured to group the plurality of sensing electrodes into a plurality of sensing groups and sequentially measure the electrical signals output from each of the plurality of sensing groups, and each of the plurality of sensing groups comprises at least two sensing electrodes,
wherein order numbers of the sensing electrodes included in each of the plurality of sensing groups are sequentially changed in accordance with an order number of each of the plurality of sensing groups.

4. The fingerprint sensor of claim 1, wherein the signal measurement unit is further configured to group the plurality of sensing electrodes into the plurality of sensing groups and sequentially measure the electrical signals output from each of the plurality of sensing groups.

5. The fingerprint sensor of claim 1, further comprising an electrode configured to apply a predetermined fixed voltage to at least two channels among a plurality of channels formed by the plurality of driving electrodes and the plurality of sensing electrodes on the touchpad.

6. The fingerprint sensor of claim 5, wherein channels receiving the predetermined fixed voltage are on a periphery of the touchpad.

7. The fingerprint sensor of claim 5, wherein the processor is further configured to calculate the mutual capacitance of a channel adjacent to the channels receiving the predetermined fixed voltage, based on the gross mutual capacitance in an area which includes the channels receiving the predetermined fixed voltage and the channel adjacent to the channels receiving the predetermined fixed voltage.

8. A method of driving a fingerprint sensor including a plurality of driving electrodes and a plurality of sensing electrodes disposed in a direction intersecting with the plurality of the driving electrodes, the plurality of driving electrodes being divided into a plurality of driving groups, the method comprising:
sequentially applying a driving signal to each of the plurality of driving groups; and
measuring electrical signals generated from the plurality of sensing electrodes in response to the driving signal,
calculating mutual capacitance based on the measured electrical signal, at each of a plurality of nodes at which each of the plurality of driving electrodes intersects with each of the plurality of sensing electrodes, by assigning different weights to gross mutual capacitances measured in each of the plurality of driving groups, based on a location of the plurality of nodes.

9. The method of claim 8,
wherein the measuring the electrical signals comprises grouping the plurality of sensing electrodes into a plurality of sensing groups and sequentially measuring the electrical signals output from each of the plurality of sensing groups.

10. The method of claim 8, the measuring the electrical signal comprises grouping the plurality of sensing electrodes into the plurality of sensing groups and sequentially measuring the electrical signal output from each of the plurality of sensing groups.

11. The method of claim 8, further comprising applying a predetermined fixed voltage to at least two channels among a plurality of channels formed by the plurality of driving electrodes and the plurality of sensing electrodes.

12. The method of claim 11, the calculating the mutual capacitance comprises calculating the mutual capacitance at a channel adjacent to a channel receiving the predetermined fixed voltage, based on the gross mutual capacitance in an area which includes the channel receiving the predetermined fixed voltage and the channel adjacent to the channel receiving the predetermined fixed voltage.

13. A fingerprint sensor comprising:
a touchpad including a plurality of driving electrodes and a plurality of sensing electrodes, the plurality of sensing electrodes being disposed in a direction intersecting with the plurality of driving electrodes, the plurality of driving electrodes being divided into a plurality of driving groups;
a driver configured to sequentially apply a driving signal to each of the plurality of driving groups;
a signal measurement unit configured to group the plurality of sensing electrodes into a plurality of sensing groups that partially overlap with each other, and measure, in response to the drive signal, gross mutual capacitances from each of the plurality of sensing groups that comprises a same sensing node at which one of the plurality of driving electrodes intersects with one of the plurality of sensing electrodes; and
a processor configured to calculate a mutual capacitance of the sensing node by averaging the gross mutual capacitances measured from each of the plurality of sensing groups.

* * * * *